(12) United States Patent
Liang et al.

(10) Patent No.: US 12,308,191 B2
(45) Date of Patent: May 20, 2025

(54) CIRCUIT BREAKER AND POWER DISTRIBUTION BOX

(71) Applicant: HUAWEI DIGITAL POWER TECHNOLOGIES CO., LTD., Shenzhen (CN)

(72) Inventors: Zehua Liang, Dongguan (CN); Wei Guo, Dongguan (CN); Yanxing Yang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 279 days.

(21) Appl. No.: 17/981,215

(22) Filed: Nov. 4, 2022

(65) Prior Publication Data
US 2023/0054526 A1 Feb. 23, 2023

Related U.S. Application Data

(63) Continuation of application No. PCT/CN2020/089267, filed on May 8, 2020.

(51) Int. Cl.
*H01H 71/10* (2006.01)
*H01H 71/02* (2006.01)
*H02G 3/08* (2006.01)

(52) U.S. Cl.
CPC ............ *H01H 71/10* (2013.01); *H01H 71/02* (2013.01); *H02G 3/08* (2013.01)

(58) Field of Classification Search
CPC .......... H01H 71/10; H01H 71/02; H01H 3/46; H01H 50/045; H01H 71/16; H01H 71/2472; H01H 73/08; H01H 71/58; H02G 3/08

(Continued)

(56) References Cited

U.S. PATENT DOCUMENTS

| 2018/0090292 A1* | 3/2018 | Zhang | H01H 83/226 |
| 2019/0081459 A1* | 3/2019 | Ha | H02B 1/20 |

(Continued)

FOREIGN PATENT DOCUMENTS

| CN | 1753128 A | 3/2006 |
| CN | 100477055 C | 4/2009 |

(Continued)

OTHER PUBLICATIONS

Extended European Search Report in European Appln No. 20934567. 7, dated Apr. 24, 2023, 6 pages.

(Continued)

*Primary Examiner* — Shawki S Ismail
*Assistant Examiner* — Lisa N Homza
(74) *Attorney, Agent, or Firm* — Fish & Richardson P.C.

(57) ABSTRACT

This application discloses example circuit breakers and power distribution boxes, and relates to the field of communication device technologies. One example circuit breaker includes a housing, a control apparatus, a current signal collection mechanism, an operating mechanism, and a contactor mechanism that are disposed in the housing. The current signal collection mechanism has a first fixed contact and a second fixed contact that are electrically connected. The operating mechanism has a rotating part and a first moving contact. The first moving contact is electrically connected to a first electrode cable inlet port of the circuit breaker. Rotating the rotating part may make a circuit between the first moving contact and the first fixed contact connected/disconnected.

20 Claims, 10 Drawing Sheets

(58) Field of Classification Search
USPC .............................................................. 335/6
See application file for complete search history.

(56) References Cited

U.S. PATENT DOCUMENTS

2019/0081466 A1* 3/2019 Ha ........................ G01R 19/165
2022/0172913 A1* 6/2022 Rao ........................ H01H 33/04

FOREIGN PATENT DOCUMENTS

| CN | 205016477 U | 2/2016 |
| CN | 106971923 A | 7/2017 |
| CN | 206774470 U | 12/2017 |
| CN | 108321047 A | 7/2018 |
| CN | 109686625 A | 4/2019 |
| CN | 110137048 A | 8/2019 |
| EP | 0780860 A1 | 6/1997 |
| JP | H08124474 A | 5/1996 |

OTHER PUBLICATIONS

International Search Report and Written Opinion in International Appln. No. PCT/CN2020/089267, mailed on Feb. 18, 2021, 13 pages (with English translation).

* cited by examiner

CIRCUIT BREAKER AND POWER DISTRIBUTION BOX

CROSS-REFERENCE TO RELATED APPLICATIONS

This application is a continuation of International Application No. PCT/CN2020/089267, filed on May 8, 2020. The disclosure of which is hereby incorporated by reference in its entirety.

TECHNICAL FIELD

This application relates to the field of communications device technologies, and in particular, to a circuit breaker and a power distribution box.

BACKGROUND

In a power supply and distribution system, a circuit breaker usually needs to be used to distribute electrical energy. As a key component in the power supply and distribution system, the circuit breaker can play a role in controlling a connection/disconnection of a circuit, and further has a specific protection function.

Specifically, a mechanical switch may be disposed in the circuit breaker, and a worker may operate the mechanical switch to switch the circuit breaker between a closed state and an open state, to make the circuit connected or disconnected. In addition, after a fault such as an overload or a short circuit occurs in the circuit, the circuit breaker can also be automatically switched to the open state to switch off a current in the circuit, thereby implementing the protection function of the circuit breaker.

At present, closing and opening of the circuit breaker are implemented by using the mechanical switch and an electromagnetic coil, and on/off control of the circuit breaker is mainly performed through a manual operation. In other words, apart from an automatic opening operation performed after a fault occurs, the closed state or the open state of the circuit breaker is implemented by operating the mechanical switch. Moreover, after the fault in the circuit is rectified, maintenance personnel need to operate the mechanical switch at a site of the circuit breaker to restore the connection of the circuit. Consequently, the circuit breaker has great limitations and inconvenience in use.

SUMMARY

According to a first aspect, this application provides a circuit breaker. The circuit breaker includes a housing, a current signal collection mechanism, an operating mechanism, a contactor mechanism, cable inlet ports, cable outlet ports, and a control apparatus. The current signal collection mechanism, the operating mechanism, and the contactor mechanism are disposed in the housing to implement an integration design of the circuit breaker. For specific disposing of the current signal collection mechanism, the current signal collection mechanism includes a first fixed contact and a second fixed contact, and the first fixed contact is electrically connected to the second fixed contact. The cable inlet ports of the circuit breaker are connected to a power supply line and include a first electrode cable inlet port and a second electrode cable inlet port. The operating mechanism has a rotating part and a first moving contact, the first moving contact is electrically connected to the first electrode cable inlet port, and the rotating part is capable of driving the first moving contact to rotate, to make a circuit between the first moving contact and the first fixed contact connected or disconnected. The cable outlet ports of the circuit breaker are connected to a power receiving line and include a first electrode cable outlet port and a second electrode cable outlet port, the first electrode cable outlet port is electrically connected to a second moving contact, and the second electrode cable outlet port is electrically connected to the second electrode cable inlet port. The control apparatus may be configured to control the contactor mechanism to drive the second moving contact to move, to make a circuit between the second moving contact and the second fixed contact connected or disconnected. It can be understood that, to enable the contactor mechanism to drive the second moving contact to move, the contactor mechanism and the second moving contact may be connected through a push rod, without being limited thereto.

By using the circuit breaker in this embodiment of this application, the control apparatus controls the contactor mechanism to drive the second moving contact to move, to implement remote control on on/off state switching between the power receiving line and the power supply line. The circuit breaker is applied to a radio base station disposed at a remote location, or is applied to a scenario in which periodic power-on or power-off is needed or opening or closing is performed according to system instructions. A worker can implement switching between a closed state and an open state of the circuit breaker through remote control by the control apparatus on the contactor mechanism, without a need to close or open the circuit breaker on site. This effectively reduces work intensity of the worker and reduces maintenance costs. In addition, when the circuit breaker is used for electrical devices (for example, 4G base stations or 5G gNBs in a remote area) that have a low demand or have no demand in a specific time period, the circuit breaker can be switched between the closed state and the open state in time, and this is conducive to energy conservation.

In a possible implementation of this application, the circuit breaker further includes a signal port, and a signal terminal is disposed in the signal port. For specific disposing of the control apparatus, the control apparatus may be but is not limited to a signal circuit board. The signal circuit board is inserted into the signal port, and the signal terminal is connected to the signal circuit board by using a signal. It can be understood that, when the control apparatus controls the contactor mechanism, an electrical connection between the signal circuit board and the contactor mechanism may be implemented by, without being limited to, connecting the contactor mechanism to the signal terminal in the signal port.

In addition, a limiting structure may be further disposed in the signal port, and a notch is further disposed at an end of the signal circuit board. In this way, the limiting structure may be inserted into the notch, to limit locations of the signal circuit board and the signal port, so that the signal connection between the signal terminal and the signal circuit board is reliable.

In a possible implementation of this application, the control apparatus may be further configured to: detect current intensity at the first fixed contact; and when the detected current intensity falls within a preset current intensity threshold range, determine that the circuit between the first fixed contact and the first moving contact is connected; or when the detected current intensity exceeds a preset current intensity threshold range, determine that the circuit between the first fixed contact and the first moving contact is disconnected. In addition, the control apparatus may be further configured to: detect current intensity at the second fixed contact; and when the detected current intensity falls within a preset current intensity threshold range, determine that the circuit between the second fixed contact and the second moving contact is connected; or when the detected current intensity exceeds a preset current intensity threshold range, determine that the circuit between the second fixed contact and the second moving contact is disconnected. The control apparatus may detect the current intensity at the first fixed contact and the second fixed contact, to determine circuit statuses of corresponding locations based on the current intensity at the two fixed contacts, thereby providing a basis for remote fault detection of the circuit breaker. This is conducive to reducing maintenance costs of the circuit breaker.

In a possible implementation of this application, the circuit breaker may further include a short-circuit protection mechanism, and the short-circuit protection mechanism may be disposed on one side of the operating mechanism, without being limited thereto. For specific disposing of the short-circuit protection mechanism, the short-circuit protection mechanism may include an electromagnetic coil, an iron core, a shaft, an armature spring, and an armature, the electromagnetic coil is sleeved on the iron core, the armature spring is sleeved on the shaft, and the armature is fixedly connected to the armature spring. One end of the electromagnetic coil is electrically connected to the second moving contact through a conductor, and the other end of the electromagnetic coil is electrically connected to the first electrode cable outlet port. In this way, when a current flowing through the electromagnetic coil exceeds a preset current threshold range, the electromagnetic coil generates a large magnetic field, and magnetic force generated by the magnetic field attracts the armature to rotate around the shaft. In the rotation process, the armature pushes the rotating part to rotate, so that the first moving contact moves in a direction away from the first fixed contact. In this way, a current path between the first electrode cable inlet port and the first electrode cable outlet port is cut off, thereby implementing a short-circuit protection function.

In a possible implementation of this application, the circuit breaker may further include an overload protection mechanism, and the overload protection mechanism is made of a material that can bend and deform when subjected to heat. For specific disposing of the overload protection mechanism, one end of the overload protection mechanism is rigidly connected to the first electrode cable inlet port. In this way, when heat generated in the power receiving line exceeds a preset heat threshold range, the overload protection mechanism deforms and drives the rotating part of the operating mechanism to rotate, so that the first moving contact moves in the direction away from the first fixed contact. In this way, the circuit between the first moving contact and the first fixed contact is disconnected, thereby implementing an overload protection function of the circuit breaker.

In addition, a first sliding slot may be further disposed on the rotating part of the operating mechanism, and a first connecting rod is further disposed between the overload protection mechanism and the operating mechanism. One end of the first connecting rod is hinged to the overload protection mechanism, and the other end of the first connecting rod is capable of sliding along the first sliding slot. A connecting part is further disposed on an inner sidewall of the housing, a second sliding slot is disposed on the connecting part, and a hinge point between the first connecting rod and the overload protection mechanism is capable of sliding along the second sliding slot. When an overload fault exists in the power receiving line, a large amount of heat is generated in the power receiving line. When the heat exceeds a heat threshold preset for the circuit breaker, the overload protection mechanism deforms, so that the hinge point at which the first connecting rod is hinged to the overload protection mechanism slides along the second sliding slot, to drive the first connecting rod to move in a direction away from the operating mechanism. In addition, the first connecting rod slides in the first sliding slot and pulls the rotating part to rotate, so that the first moving contact moves in the direction away from the first fixed contact, until the first moving contact is separated from the first fixed contact. In this way, the current path between the first electrode cable inlet port and the first electrode cable outlet port is cut off, thereby implementing the overload protection function.

In a possible implementation of this application, the circuit breaker further includes a button mechanism, and movement of the button mechanism can drive the rotating part of the operating mechanism to rotate, to make the circuit between the first fixed contact and the first moving contact connected or disconnected.

For specific disposing of the button mechanism, the button mechanism includes a button, a rotating shaft, and a second connecting rod, one end of the second connecting rod is fastened to an edge of the rotating shaft, and the other end of the second connecting rod is fastened to an edge of the rotating part of the operating mechanism. When the button moves towards an interior of the housing, rotation of the rotating shaft drives the second connecting rod to rotate, and the rotating part rotates with the second connecting rod, to make the circuit between the first fixed contact and the first moving contact connected. When the button moves towards an exterior of the housing, rotation of the rotating shaft drives the second connecting rod to rotate, and the rotating part rotates with the second connecting rod, to make the circuit between the first fixed contact and the first moving contact disconnected. In this embodiment of this application, the control apparatus may control movement of the contactor mechanism to implement remote control on switching between a connected state and a disconnected state of the circuit of the circuit breaker. In addition, switching between the connected state and the disconnected state of the circuit of the circuit breaker may alternatively be manually performed by using the button mechanism. This is conducive to improving use convenience of the circuit breaker.

In a possible implementation of this application, the circuit breaker further includes an arc extinguishing mechanism, the first fixed contact and the second fixed contact of the current collection mechanism may be electrically connected to the arc extinguishing mechanism through a copper bar, and the arc extinguishing mechanism is electrically connected to the signal terminal in the signal port of the circuit breaker. According to the technical solution of this embodiment of this application, the operating mechanism and the contactor mechanism can share one arc extinguishing system, so that the arc extinguishing mechanism can extinguish electric arcs generated between the first moving contact and the first fixed contact and between the second moving contact and the second fixed contact. This is conducive to improving safety of using the circuit breaker.

According to a second aspect, this application further provides a power distribution box. The power distribution box may include a box body and one or more circuit breakers in the first aspect that are inserted into the box body. The plurality of circuit breakers are disposed in parallel, and each circuit breaker is connected to a power supply end of a power supply and distribution system.

In this implementation of this application, the circuit breaker may divide one line of electricity entering the power distribution box into a plurality of lines of electricity, and each circuit breaker may be connected to one electrical device or may be connected to a plurality of electrical devices. The circuit breaker divides one line of electricity entering the power distribution box into a plurality of lines of electricity, which are used to respectively supply power to different electrical devices. In this way, even if a fault occurs in one circuit, electrical devices in other circuits can still continue to work, thereby implementing a circuit protection function.

BRIEF DESCRIPTION OF DRAWINGS

Figure 1:
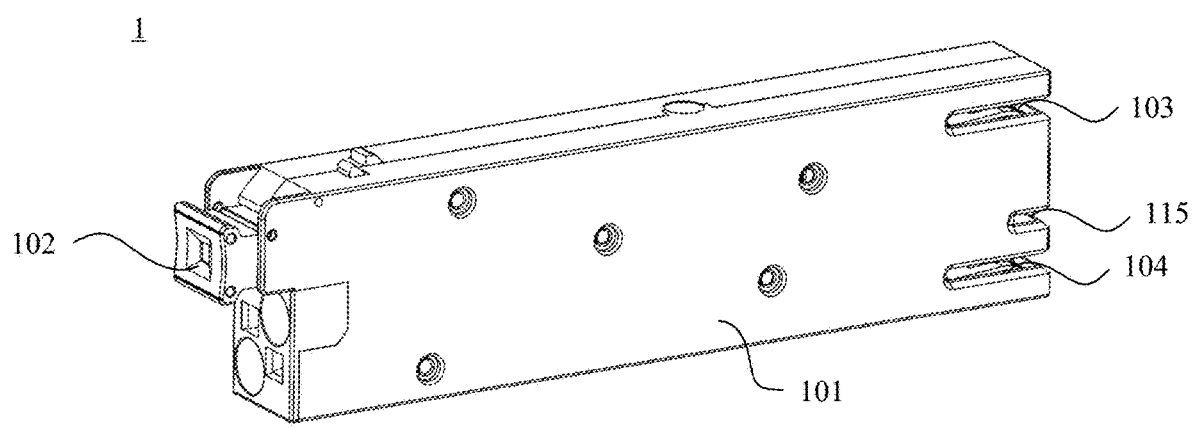
FIG. 1 is a schematic diagram of a structure of a circuit breaker according to an embodiment of this application.

1: circuit breaker; 101: housing; 102: button mechanism; 1021: button; 1022: rotating shaft; 1023: second connecting rod;
103: first electrode cable inlet port; 104: second electrode cable inlet port; 105A, 105B, 105C, and 105D: copper bars;
106: first electrode cable outlet port; 1061: second moving contact; 107: second electrode cable outlet port; 108: operating mechanism;
1081: rotating part; 1082: first moving contact; 1083: first sliding slot; 109: current collection mechanism;
1091: first fixed contact; 1092: second fixed contact; 110: first connecting rod; 111: short-circuit protection mechanism;
1111: electromagnetic coil; 1112: iron core; 1113: shaft; 1114: armature spring; 1115: armature;
112: overload protection mechanism; 113: third connecting rod; 114: connecting part; 1141: second sliding slot; 115: signal port;
1151: signal terminal; 1152: limiting structure; 116: signal circuit board; 1161: notch; 117: contactor mechanism;
118: push rod; 119: arc extinguishing mechanism; 2: power distribution box; and 201: box body.

DESCRIPTION OF EMBODIMENTS

To make the objectives, technical solutions, and advantages of this application clearer, the following further describes this application in detail with reference to accompanying drawings.

For ease of understanding a circuit breaker provided in embodiments of this application, the following first describes a specific application scenario of the circuit breaker. The circuit breaker provided in embodiments of this application can be widely applied to various power supply and distribution systems. For example, the circuit breaker can be applied to a power supply and distribution system for household electricity, and is configured to switch on, bear, and switch off a current between a power supply grid and a household circuit. For example, the power supply and distribution system is provided with four household circuits: a first household circuit, a second household circuit, a third household circuit, and a fourth household circuit. In addition, the household circuits are correspondingly provided with circuit breakers: a first circuit breaker, a second circuit breaker, a third circuit breaker, and a fourth circuit breaker, respectively. When a circuit between a power supply grid or a power supply source and a household circuit needs to be connected, a circuit breaker may be switched to a closed state. When a circuit between a power supply grid and a household circuit needs to be disconnected, a circuit breaker may be switched to an open state. In this way, a connected/disconnected state of the household circuit is controlled by controlling the closed state and the open state of the circuit breaker. For example, when a first household meets a normal electricity demand, a worker can switch the first circuit breaker to the closed state, so that the first household can normally use electricity. When a second household is in arrears with an electricity fee or is in an abnormal state, the worker can switch the second circuit breaker to the open state, so that the user cannot use electricity.

In addition, the circuit breaker can also be applied to a power supply and distribution system of an enterprise electrical device or a public electrical device, and is configured to switch on, bear, and switch off a current between a power supply grid and the enterprise electrical device or the public electrical device. For example, when an electrical device (for example a 4G base station or a 5G gNB) needs to work normally, the worker can switch the circuit breaker to the closed state, so that the power supply grid can supply electrical energy needed for normal work to the electrical device. When the electrical device needs to be overhauled and maintained, the worker can switch the circuit breaker to the open state, to facilitate operations such as the overhaul and maintenance of the electrical device.

However, for a device at a remote location such as a radio base station, or a scenario in which periodic power-on or power-off is needed or opening or closing is performed according to system instructions, for example, a scenario in which a smart meter remotely performs power-off for a user who is in arrears with an electricity fee, the worker needs to close or open the circuit breaker on site in these scenarios, and consequently maintenance costs are high. In addition, it is inconvenient for the worker to switch the circuit breaker between the closed state and the open state for electrical devices (for example, 4G base stations or 5G gNBs in a remote area) that have a low demand or have no demand in a specific time period, and this is not conducive to energy conservation.

In view of disadvantages of the circuit breaker, an embodiment of this application provides a circuit breaker that can remotely control a closed state and an open state of the circuit breaker. For ease of understanding the circuit breaker provided in this embodiment of this application, with reference to specific embodiments and accompanying drawings, the following describes in detail the circuit breaker provided in this application.

Terms used in the following embodiments are merely intended to describe specific embodiments, but are not intended to limit this application. As used in this specification and the appended claims of this application, singular expressions "a", "an", "the foregoing", "this", and "such a" are intended to also include expressions such as "one or more", unless the context clearly gives indications to the contrary. It should also be understood that in the following embodiments of this application, "at least one" or "one or more" means one, two, or more. The term "and/or" describes an association relationship between associated objects, and represents that three relationships may exist. For example, A and/or B may represent the following cases: Only A exists, both A and B exist, and only B exists. A and B each may be singular or plural. The character "I" generally indicates an "or" relationship between associated objects.

Referencing "an embodiment", "some embodiments", or the like described in this specification means that a specific feature, structure, or characteristic described with reference to the embodiment is included in one or more embodiments of this application. Therefore, statements "in an embodiment", "in some embodiments", "in some other embodiments", "in still some other embodiments", and the like in different parts of this specification unnecessarily reference a same embodiment, but mean "one or more embodiments but not all embodiments", unless otherwise specified particularly. Terms "include", "include", "have", and variants thereof all mean "including but not limited to", unless otherwise specified particularly.

Figure 2:
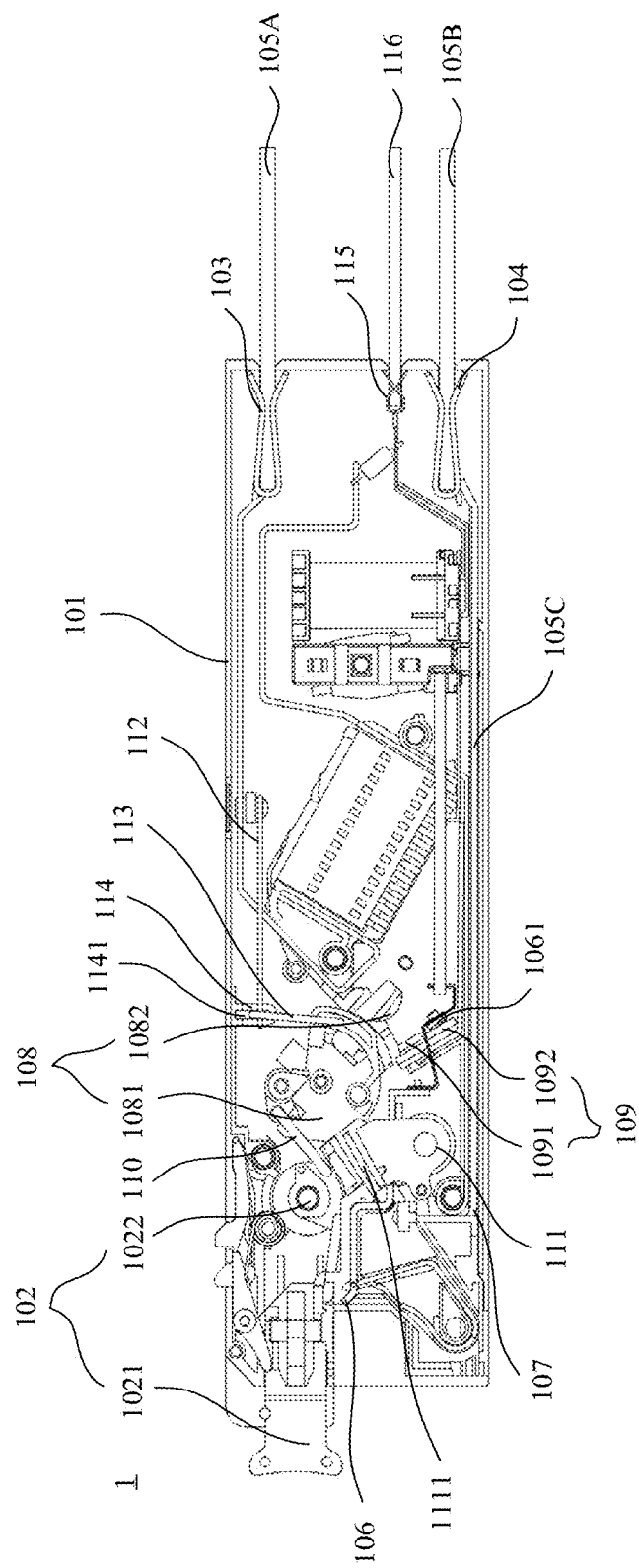
FIG. 2 is a schematic diagram of a structure of a circuit breaker according to another embodiment of this application.

FIG. 1 is a schematic diagram of an overall structure of a circuit breaker 1 according to an embodiment of this application. The circuit breaker 1 provided in this embodiment of this application may include a housing 101 and a button mechanism 102 disposed on the housing 101. The button mechanism 102 may be used as a switch of the circuit breaker 1, to manually switch the circuit breaker 1 between a closed state and an open state. Still with reference to FIG. 1, the circuit breaker 1 further includes cable inlet ports disposed in the housing 101, and the cable inlet ports are configured to connect to a power supply line. There are two cable inlet ports: a first electrode cable inlet port 103 and a second electrode cable inlet port 104. With reference to FIG. 2, the first electrode cable inlet port 103 is connected to a first electrode of a power supply and distribution system through a copper bar 105A, the second electrode cable inlet port 104 is connected to a second electrode of the power supply and distribution system through a copper bar 105B, and the first electrode cable inlet port 103 and the second electrode cable inlet port 104 may be used as power supply line ports of an electrical device, so that the two cable inlet ports are connected to the power supply line.

With reference to FIG. 2, the circuit breaker 1 in this embodiment of this application further includes cable outlet ports. There are two cable outlet ports: a first electrode cable outlet port 106 and a second electrode cable outlet port 107. The first electrode cable outlet port 106 is used as a power receiving line port for connecting the circuit breaker 1 to the electrical device, and the second electrode cable outlet port 107 is used as another power receiving line port for connecting the circuit breaker 1 to the electrical device, so that the two cable outlet ports are connected to a power receiving line. To supply power to the electrical device by using the circuit breaker 1, the first electrode cable inlet port 103 may be electrically connected to the first electrode cable outlet port 106, and the second electrode cable inlet port 104 may be electrically connected to the second electrode cable outlet port 107. In a possible embodiment of this application, the first electrode cable outlet port 106 and the second electrode cable outlet port 107 may be disposed on a same side of the housing 101 as the button mechanism 102, to facilitate use of the circuit breaker 1.

In addition, still with reference to FIG. 2, to enable the circuit breaker 1 to control an on/off state between a cable inlet port and a cable outlet port, an on/off system may be disposed in the circuit breaker 1. A power supply on/off state of the electrical device can be controlled by controlling a connection/disconnection between the first electrode cable inlet port 103 and the first electrode cable outlet port 106 or by controlling a connection/disconnection between the second electrode cable inlet port 104 and the second electrode cable outlet port 107. Based on this, an example in which the on/off system is disposed between the first electrode cable inlet port 103 and the first electrode cable outlet port 106 is used to describe a process of controlling the on/off state between a cable inlet port and a cable outlet port in this embodiment of this application. A manner of connecting the second electrode cable inlet port 104 to the second electrode cable outlet port 107 may be but is not limited to a connection implemented through a copper bar 105C.

With reference to FIG. 2, in this embodiment of this application, the on/off system may include an operating mechanism 108 and a current collection mechanism 109. The operating mechanism 108 and the current collection mechanism 109 are disposed in the housing 101 of the circuit breaker 1. Still with reference to FIG. 2, the operating mechanism 108 is rotatably connected to the button mechanism 102. The operating mechanism 108 includes a rotating part 1081 and a first moving contact 1082 disposed on the rotating part 1081. The first moving contact 1082 is electrically connected to the first electrode cable inlet port 103.

The button mechanism 102 includes a button 1021 and a rotating shaft 1022. A first connecting rod 110 is disposed between the rotating shaft 1022 and the rotating part 1081 of the operating mechanism 108. One end of the first connecting rod 110 is fastened to the rotating shaft 1022, for example, fastened to an edge location of the rotating shaft 1022, so that the first connecting rod 110 is driven to rotate in a rotation process of the rotating shaft 1022. The other end of the first connecting rod 110 is fastened to the rotating part 1081, and may be specifically fastened to an edge location of the rotating part 1081, so that the first connecting rod 110 can drive the rotating part 1081 to rotate.

The current collection mechanism 109 is provided with a first fixed contact 1091. The first fixed contact 1091 is disposed in a rotation direction of the rotating part 1081 and may be in contact with the first moving contact 1082, so that the current collection mechanism 109 can collect an electrical signal of the first electrode cable inlet port 103. To enable the current collection mechanism 109 to accurately collect the electrical signal of the first electrode cable inlet port 103, for specific disposing of the current collection mechanism 109, a current collection mechanism 109 with high precision may be selected.

Moreover, still with reference to FIG. 2, the on/off system may further include a second moving contact 1061 disposed between the first electrode cable outlet port 106 and the current collection mechanism 109. In addition, the current collection mechanism 109 is further provided with a second fixed contact 1092. The second fixed contact 1092 is electrically connected to the first fixed contact 1091. The second fixed contact 1092 may be in contact with the second moving contact 1061 to implement an electrical connection between the first electrode cable outlet port 106 and the current collection mechanism 109. It can be understood that, to enable on/off state switching between the first electrode cable outlet port 106 and the first electrode cable inlet port 103 by operating the button 1021, during use of the circuit breaker 1, the circuit breaker 1 may make the second fixed contact 1092 and the second moving contact 1061 in a contact state.

Based on the foregoing structure, when the button 1021 of the button mechanism 102 is pressed, the button 1021 moves towards an interior of the housing 101 of the circuit breaker 1, to push the rotating shaft 1022 to rotate. The first connecting rod 110 rotates with rotation of the rotating shaft 1022, to push the first moving contact 1082 on the rotating part 1081 of the operating mechanism 108 to rotate in a direction towards the first fixed contact 1091 of the current collection mechanism 109, until the first moving contact 1082 comes into contact with the first fixed contact 1091. In this case, with reference to FIG. 3, a circuit between the first electrode cable outlet port 106 and the first electrode cable inlet port 103 is in a connected state. In addition, when the circuit breaker 1 is in a state shown in FIG. 3, if the circuit between the first electrode cable outlet port 106 and the first electrode cable inlet port 103 needs to be disconnected, only the button 1021 needs to be pulled out of the housing 101, so that the circuit breaker 1 is in a state shown in FIG. 2.

In this embodiment of this application, a rotation direction of the rotating shaft 1022 and a location at which the first connecting rod 110 is disposed between the rotating shaft 1022 and the rotating part 1081 may be further adjusted, so that when the button 1021 is pressed, the first moving contact 1082 rotates in the direction towards the first fixed contact 1091; and when the button 1021 is pulled out of the housing 101 of the circuit breaker 1, the first moving contact 1082 rotates in a direction away from the first fixed contact 1091. In a possible embodiment of this application, with reference to FIG. 3, a second connecting rod 1023 may be disposed between the button 1021 and the rotating shaft 1022, one end of the second connecting rod 1023 is fastened to the button, and the other end of the second connecting rod 1023 is fastened to an edge location of the rotating shaft 1022. A specific location of the second connecting rod 1023 on the rotating shaft 1022 may be arranged based on a requirement on the rotation direction of the rotating shaft 1022. For example, still with reference to FIG. 3, the second connecting rod 1023 is fixedly connected to a low location of the rotating shaft 1022. In this way, when the button 1021 of the button mechanism 102 is pressed, the rotating shaft 1022 may be controlled to rotate counterclockwise. In this case, the first connecting rod 110 rotates clockwise to drive the rotating part 1081 to rotate clockwise.

Figure 3:
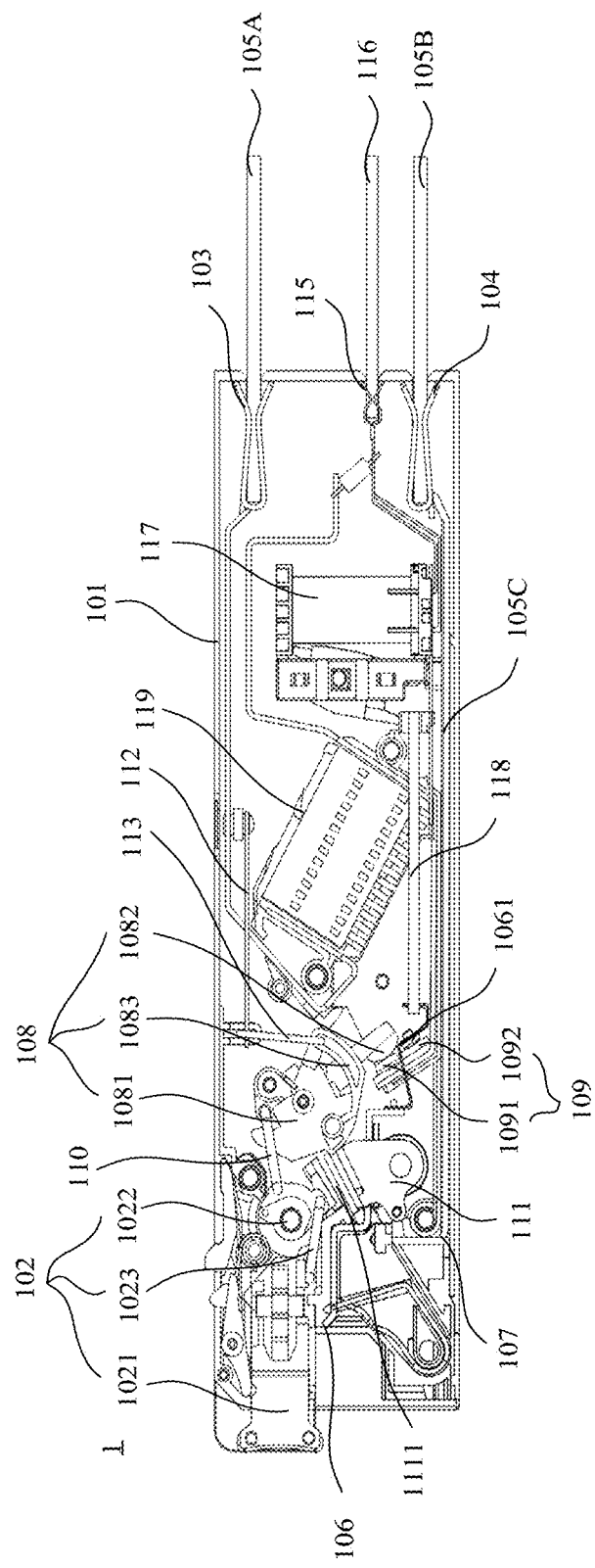
FIG. 3 is a schematic diagram of a structure of a circuit breaker according to another embodiment of this application.
Figure 4:
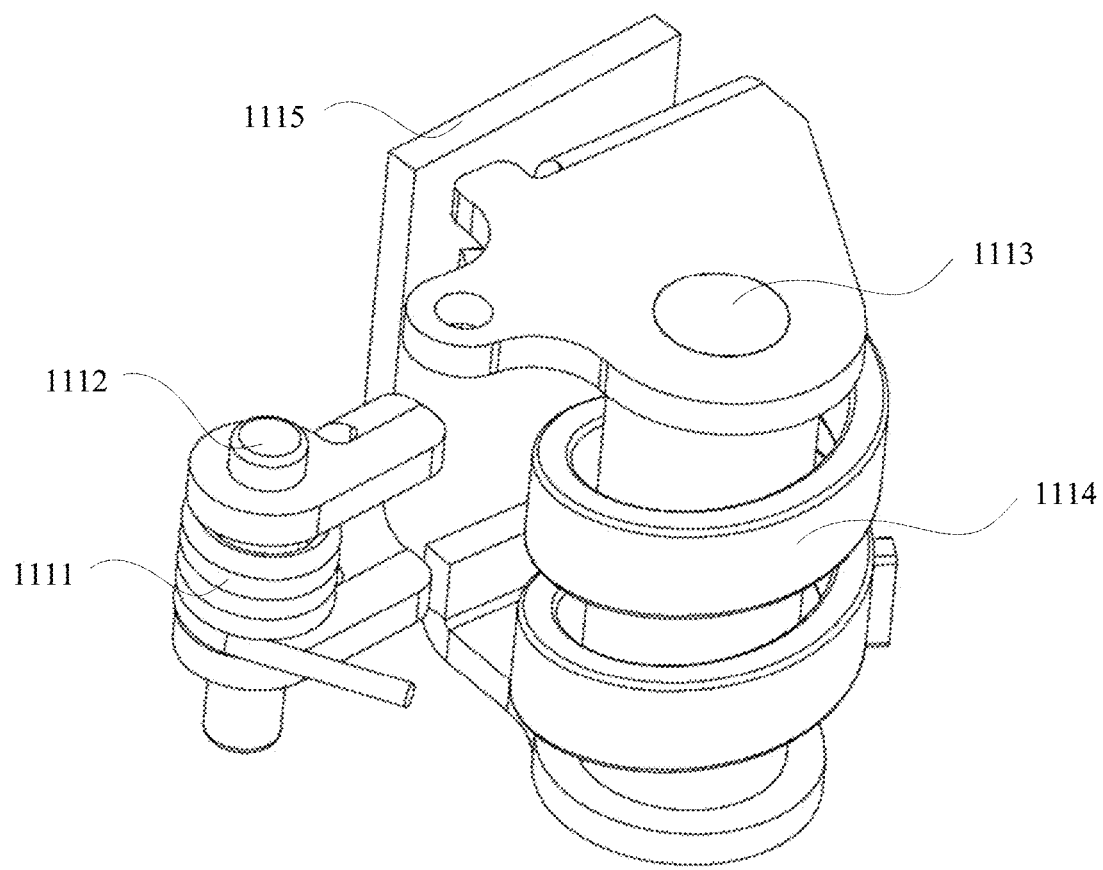
FIG. 4 is a schematic diagram of a structure of a short-circuit protection structure of a circuit breaker according to an embodiment of this application.

In a process of using the circuit breaker 1, a short circuit fault may occur in the power receiving line. If the power supply line still supplies electrical energy to the power receiving line after the fault occurs, a more serious accident may be caused, and consequently a major safety hazard exists. To improve safety between the power supply line and the power receiving line, as shown in FIG. 3, in an embodiment provided in this application, a short-circuit protection mechanism 111 may be disposed in the circuit breaker 1. The short-circuit protection mechanism 111 is disposed on one side of the operating mechanism 108. For specific disposing of the short-circuit protection mechanism 111, with reference to FIG. 4, the short-circuit protection mechanism 111 may include an electromagnetic coil 1111, an iron core 1112, a shaft 1113, an armature spring 1114, and an armature 1115. The electromagnetic coil 1111 is sleeved on the iron core 1112, the armature spring 1114 is sleeved on the shaft 1113, and the armature 1115 is fixedly connected to the armature spring 1114. With reference to FIG. 3, one end of the electromagnetic coil 1111 may be electrically connected to the second moving contact 1061 through a conductor (for example, a metal wire or a metal sheet), and the other end of the electromagnetic coil 1111 may be electrically connected to the first electrode cable outlet port 106. A current from the first electrode cable inlet port 103 flows to the first electrode cable outlet port 106 through the conductor and the electromagnetic coil 1111. When a short circuit fault exists in the power receiving line, the current flowing through the electromagnetic coil 1111 is excessively large. When the current exceeds a current threshold preset for the circuit breaker 1, the electromagnetic coil 1111 generates a large magnetic field, to generate electromagnetic force that attracts the armature to rotate around the shaft. After the armature 1115 is attracted by the electromagnetic coil 1111, the armature 1115 pushes the rotating part 1081 of the operating mechanism 108 to rotate, so that the first moving contact 1082 moves in the direction away from the first fixed contact 1091, until the first moving contact 1082 is separated from the first fixed contact 1091. In this way, the current path between the first electrode cable inlet port 103 and the first electrode cable outlet port 106 is cut off, thereby implementing a short-circuit protection function. It can be understood that the foregoing disposing of the short-circuit protection mechanism 111 is merely an example for description provided in this embodiment of this application. In other possible embodiments of this application, a short-circuit protection mechanism 111 in another form may be alternatively used, and a working principle thereof is similar to that described above. Details are not described herein.

In addition to a short-circuit risk, an overload fault may also occur in the power receiving line. If the power supply line still supplies electrical energy to the power receiving line after the fault occurs, a more serious accident may be caused, and consequently a major safety hazard exists. To further improve the safety between the power supply line and the power receiving line, as shown in FIG. 3, in an embodiment provided in this application, an overload protection mechanism 112 may be further disposed in the circuit breaker 1. The overload protection mechanism 112 may be disposed between the operating mechanism 108 and the first electrode cable inlet port 103. One end of the overload protection mechanism 112 may be electrically connected to the first electrode cable inlet port 103, and the other end of the overload protection mechanism 112 may be electrically connected to the first moving contact 1082.

Still with reference to FIG. 3, for specific disposing of the overload protection mechanism 112, the overload protection mechanism 112 is made of a material that can bend and deform when subjected to heat. For example, the overload protection mechanism 112 may be made of a shape memory alloy. The shape memory alloy is a material including more than two metal elements with a shape memory effect through thermoelastic martensitic phase transformation and their inverse transformation. The mechanical part made of the shape memory alloy can be embodied as follows: After plastic deformation occurs in the mechanical part within a specific temperature range, the mechanical part can be restored to its original shape within another temperature range. For example, after a curved mechanical part made of the shape memory alloy is straightened at a normal temperature or low temperature, the mechanical part keeps or roughly keeps a shape of a straight line. When the mechanical part is heated to a specific temperature, the mechanical part is automatically restored to its original curved shape. Alternatively, the overload protection mechanism 112 may be made of a bimetallic strip. A bimetallic strip is a composite material including two or more metals or other materials with suitable properties. The bimetallic strip is also referred to as a thermal bimetal strip. Due to different coefficients of thermal expansion of various layers, when a temperature changes, deformation of an active layer is greater than that of a passive layer, so that the entire bimetallic strip bends towards the passive layer.

A third connecting rod 113 may be further disposed between the overload protection mechanism 112 and the operating mechanism 108, and a first sliding slot 1083 is further disposed on the rotating part 1081 of the operating mechanism 108. One end of the third connecting rod 113 is hinged to the overload protection mechanism 112, and the other end of the third connecting rod 113 is capable of sliding in the first sliding slot 1083. In addition, with reference to FIG. 2, a connecting part 114 is further disposed on an inner sidewall of the housing 101 of the circuit breaker 1, the connecting part 114 is disposed on one side that is of the first moving contact 1082 and that is away from the first fixed contact 1091, and a second sliding slot 1141 is disposed on the connecting part 114. A hinge point at which the third connecting rod 113 is hinged to the overload protection mechanism 112 may slide along the second sliding slot 1141, and the overload protection mechanism 112 is rigidly connected to the first electrode cable inlet port 103. It can be understood that in this embodiment of this application, to prevent the third connecting rod 113 from falling out of the first sliding slot 1083 in a process in which the third connecting rod 113 slides along the first sliding slot 1083, a shape of one end that is of the third connecting rod 113 and that fits in with the first sliding slot 1083 may be arranged in a hook shape or the like. Moreover, to prevent the hinge point at which the third connecting rod 113 is hinged to the overload protection mechanism 112 from falling out of the second sliding slot 1141 in the process of sliding along the second sliding slot 1141, the third connecting rod 113 and the overload protection mechanism 112 may be disposed on two sides of the connecting part 114 without being limited thereto, and the hinged connection between the third connecting rod 113 and the overload protection mechanism 112 is implemented by using a hinge pin disposed through the second sliding slot 1141.

When an overload fault exists in the power receiving line, a large amount of heat is generated in the power receiving line. When the heat exceeds a heat threshold preset for the circuit breaker 1, the overload protection mechanism 112 deforms, so that the hinge point at which the third connecting rod 113 is hinged to the overload protection mechanism 112 slides along the second sliding slot 1141, to drive the third connecting rod 113 to move in a direction away from the operating mechanism 108. In addition, the third connecting rod 113 slides in the first sliding slot 1083 and pulls the rotating part 1081 to rotate, so that the first moving contact 1082 moves in the direction away from the first fixed contact 1091, until the first moving contact 1082 is separated from the first fixed contact 1091. In this way, the current path between the first electrode cable inlet port 103 and the first electrode cable outlet port 106 is cut off, thereby implementing an overload protection function. It can be understood that the foregoing disposing manner of the overload protection mechanism 112 is merely an example for description provided in this embodiment of this application. In other possible embodiments of this application, an overload protection mechanism 112 in another form may be alternatively used, and a working principle thereof is similar to that described above. Details are not described herein.

Figure 5:
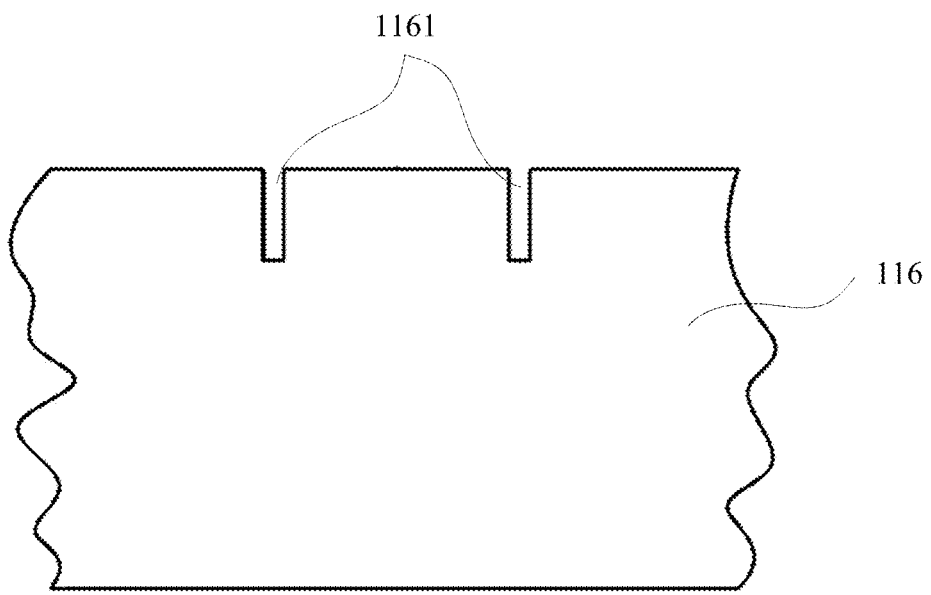
FIG. 5 is a schematic diagram of a structure of a signal circuit board according to an embodiment of this application.

With reference to FIG. 1 to FIG. 3, the circuit breaker 1 further has a signal port 115 and a control apparatus. The signal port 115 may be disposed at one end of the housing 101 of the circuit breaker 1, and the control apparatus may be but is not limited to a signal circuit board 116, for example, may be a printed circuit board (printed circuit board, PCB). The signal circuit board 116 may be inserted into the signal port 115. A signal terminal 1151 is disposed in the signal port 115 (referring to FIG. 6). The signal terminal 1151 is connected to the signal circuit board 116 by using a signal. For specific disposing of the signal circuit board 116, with reference to FIG. 5, a notch 1161 is disposed at an end of the signal circuit board 116.

Figure 6:
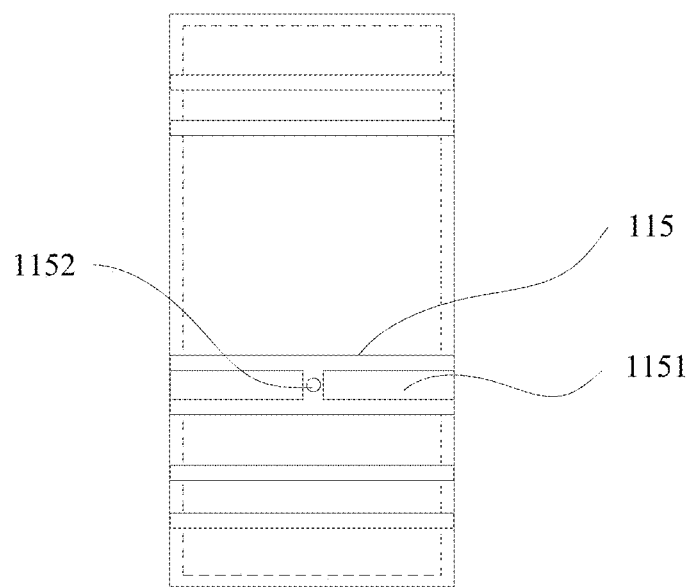
FIG. 6 is a side view of a circuit breaker according to an embodiment of this application.
Figure 7:
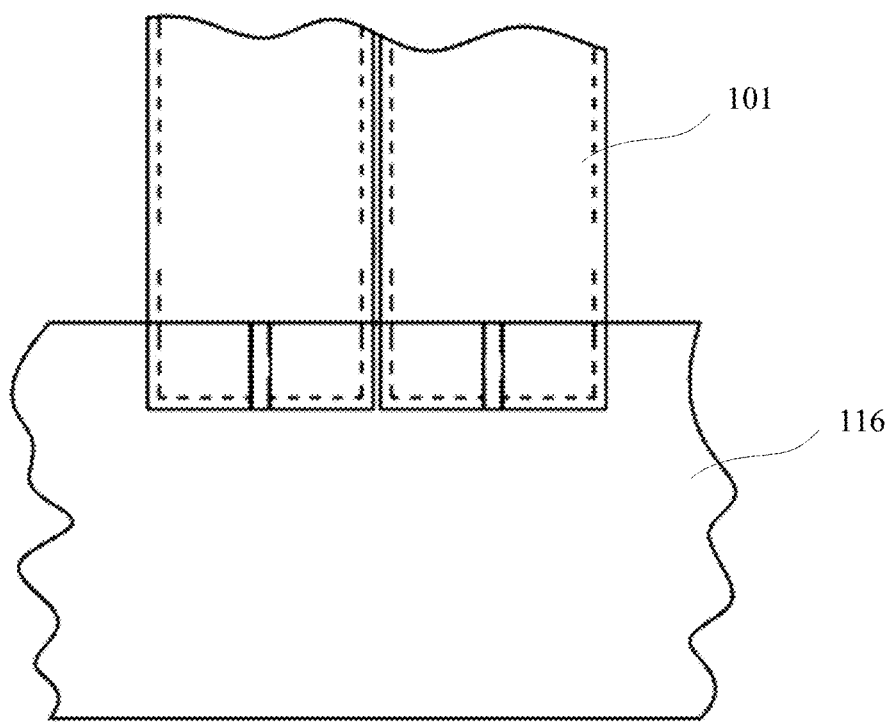
FIG. 7 is a schematic diagram of a structure in which a signal circuit board is inserted into a signal port of a circuit breaker according to an embodiment of this application.

With reference to FIG. 6, for specific disposing of the signal port 115 of the circuit breaker 1, a limiting structure 1152 may be disposed in the signal port 115. The limiting structure 1152 may be disposed as a protruding structure or a columnar structure, without being limited thereto. With reference to FIG. 7, the limiting structure 1152 may be correspondingly inserted into the notch 1161 of the signal circuit board 116, to limit the signal terminal 1151 in the signal port 115 when the signal circuit board 116 is inserted into the signal port 115, so that the signal circuit board 116 is inserted into the signal terminal 1151 in place. This improves reliability of the connection between the signal terminal 1151 and the signal circuit board 116, and implements stable transmission of an electrical signal between the signal terminal 1151 and the signal circuit board 116.

Figure 8:
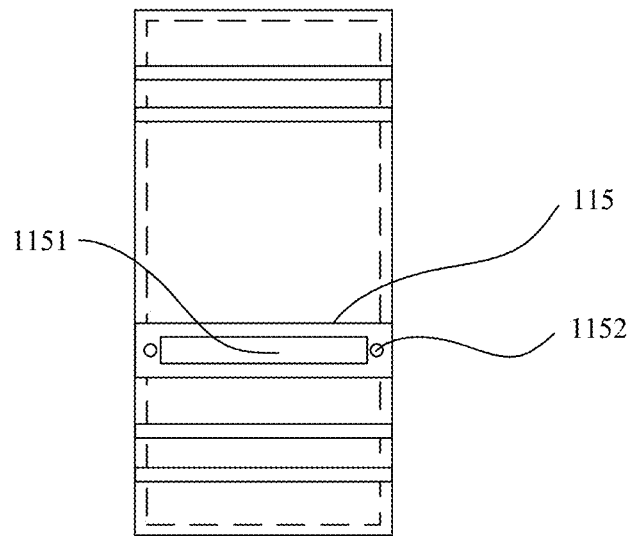
FIG. 8 is a side view of a circuit breaker according to another embodiment of this application.
Figure 9:
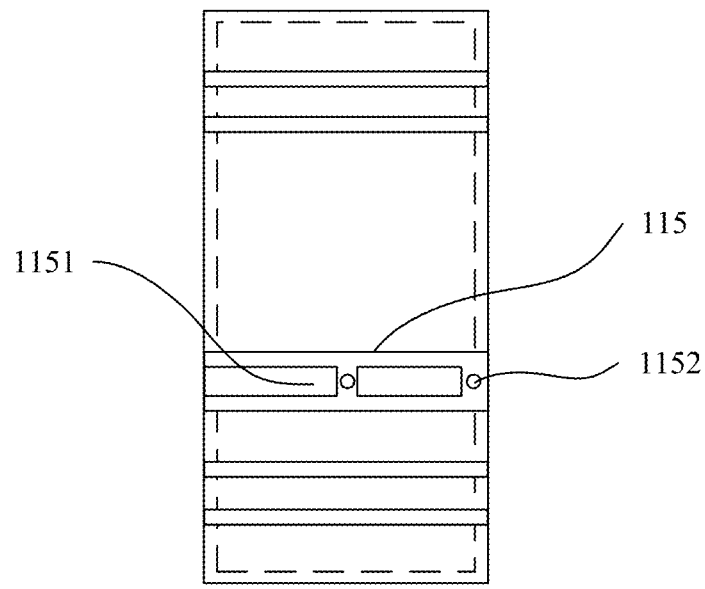
FIG. 9 is a side view of a circuit breaker according to another embodiment of this application.
Figure 10:
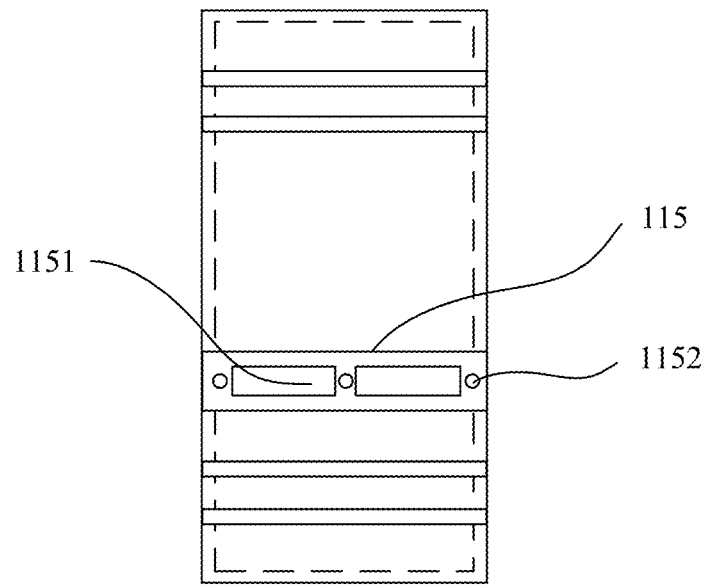
FIG. 10 is a side view of a circuit breaker according to another embodiment of this application.

For specific disposing of the limiting structure 1152, the limiting structure 1152 may be disposed at any location of the signal port 115. In addition, there may be one or more limiting structures 1152. For example, in the embodiment shown in FIG. 6, there is one limiting structure 1152, and the limiting structure 1152 is disposed at a middle location of the signal port 115. Alternatively, in an embodiment shown in FIG. 8, there are two limiting structures 1152, and the two limiting structures 1152 are disposed at two ends of the signal port 115. Alternatively, in an embodiment shown in FIG. 9, there are two limiting structures 1152, the two limiting structures 1152 are biased at one end of the signal port 115, and a signal terminal 1151 is disposed between the two limiting structures 1152. For another example, in an embodiment shown in FIG. 10, there are three limiting structures 1152, and the signal terminal 1151 is disposed between any two adjacent limiting structures 1152.

Still with reference to FIG. 3, the circuit breaker 1 in this embodiment of this application may further include a contactor mechanism 117. The signal circuit board 116 is electrically connected to the contactor mechanism 117 through the signal terminal, the contactor mechanism 117 is connected to the second moving contact 1061 through a push rod 118, the signal circuit board 116 can control an action of the contactor mechanism 117, and the push rod 118 moves with the contactor mechanism 117, to drive the second moving contact 1061 to move in a direction close to or away from the second fixed contact 1092.

Figure 11:
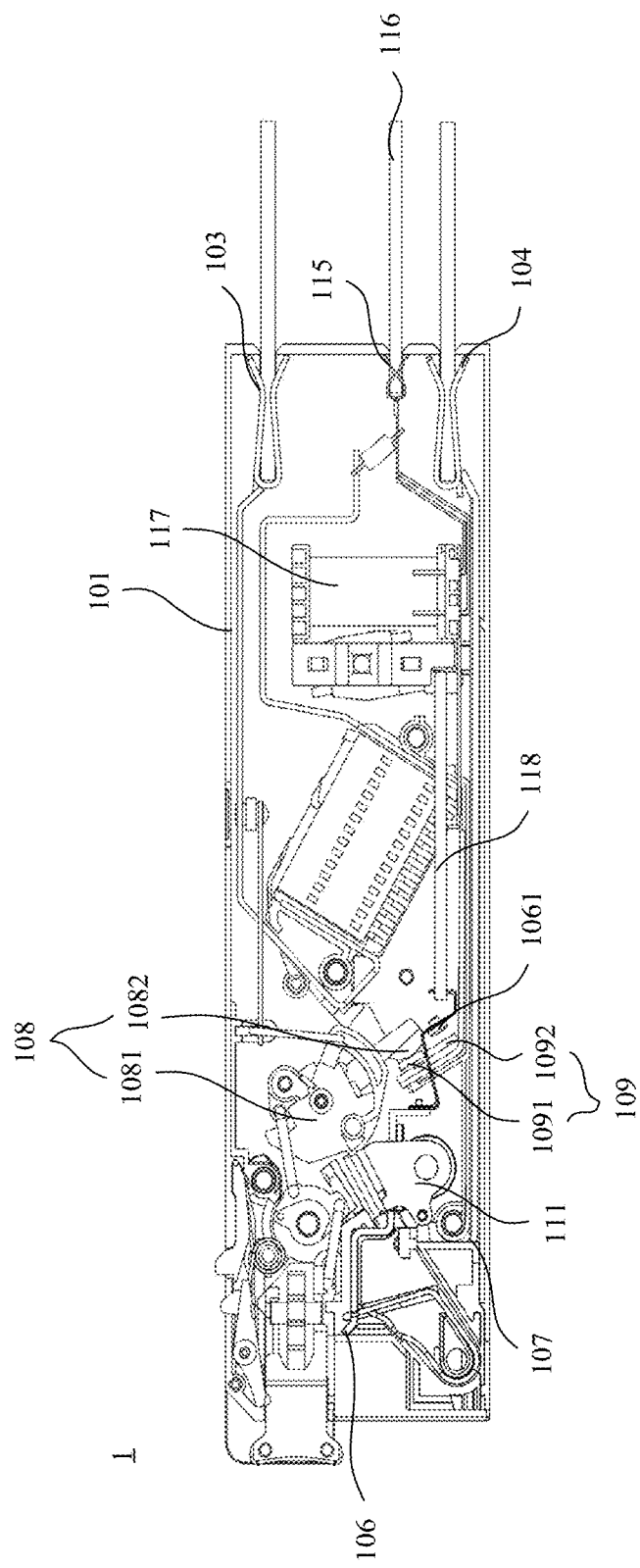
FIG. 11 is a schematic diagram of a structure of a circuit breaker according to another embodiment of this application.

In a possible embodiment of this application, the circuit breaker 1 is in the state shown in FIG. 3. Both the circuit between the first electrode cable outlet port 106 and the first electrode cable inlet port 103 and a circuit between the second electrode cable outlet port 107 and the second electrode cable inlet port 104 are in a connected state. In this case, if the power receiving line needs to be disconnected from the power supply line, the signal circuit board 116 may send a first action signal to the contactor mechanism 117. When receiving the first action signal, the contactor mechanism 117 drives the push rod 118 to move in a direction away from the current collection mechanism 109, so that the second moving contact 1061 is disconnected from the second fixed contact 1092 and a state shown in FIG. 11 is presented. In the state shown in FIG. 11, the current path between the first electrode cable outlet port 106 and the first electrode cable inlet port 103 is cut off.

It can be understood that, when the circuit breaker 1 is in the state shown in FIG. 11, if the power receiving line needs to be connected to the power supply line, the signal circuit board 116 may send a second action signal to the contactor mechanism 117. When receiving the second action signal, the contactor mechanism 117 drives the push rod 118 to move in a direction close to the current collection mechanism 109, so that the second moving contact 1061 is connected to the second fixed contact 1092 and the state shown in FIG. 3 is presented.

The contactor mechanism 117 and the signal circuit board 116 are disposed in the circuit breaker 1 in this embodiment of this application, to implement remote control on on/off state switching between the power receiving line and the power supply line. The circuit breaker 1 is applied to a radio base station disposed at a remote location, or is applied to a scenario in which periodic power-on or power-off is needed or opening or closing is performed according to system instructions, for example, a scenario in which a smart meter remotely performs power-off for a user who is in arrears with an electricity fee. A worker can implement switching between the closed state and the open state of the circuit breaker 1 through remote control by the signal circuit board 116 on the contactor mechanism 117, without a need to close or open the circuit breaker 1 on site. This effectively reduces work intensity of the worker and reduces maintenance costs. In addition, when the circuit breaker 1 is used for electrical devices (for example, 4G base stations or 5G gNBs in a remote area) that have a low demand or have no demand in a specific time period, the circuit breaker 1 can be switched between the closed state and the open state in time, and this is conducive to energy conservation.

Moreover, still with reference to FIG. 11, the signal circuit board 116 is further electrically connected to the first fixed contact 1091 and the second fixed contact 1092 of the current collection mechanism 109, to detect an on/off state of the circuit breaker 1 by detecting current intensity of the first fixed contact 1091 and the second fixed contact 1092. For example, in the state shown in FIG. 11, the current intensity at the first fixed contact 1091 detected by the signal circuit board 116 falls within a current intensity threshold range that is in a circuit connected state and that is preset for the circuit breaker 1, and the current intensity at the second fixed contact 1092 detected by the signal circuit board 116 exceeds a current intensity threshold that is in the circuit connected state and that is preset for the circuit breaker 1. Then, it can be determined that the first moving contact 1082 is connected to the first fixed contact 1091, and the second moving contact 1061 is disconnected from the second fixed contact 1092. In this case, if the second moving contact 1061 needs to be connected to the second fixed contact 1092, the signal circuit board 116 only needs to control the contactor mechanism 117.

Figure 12:
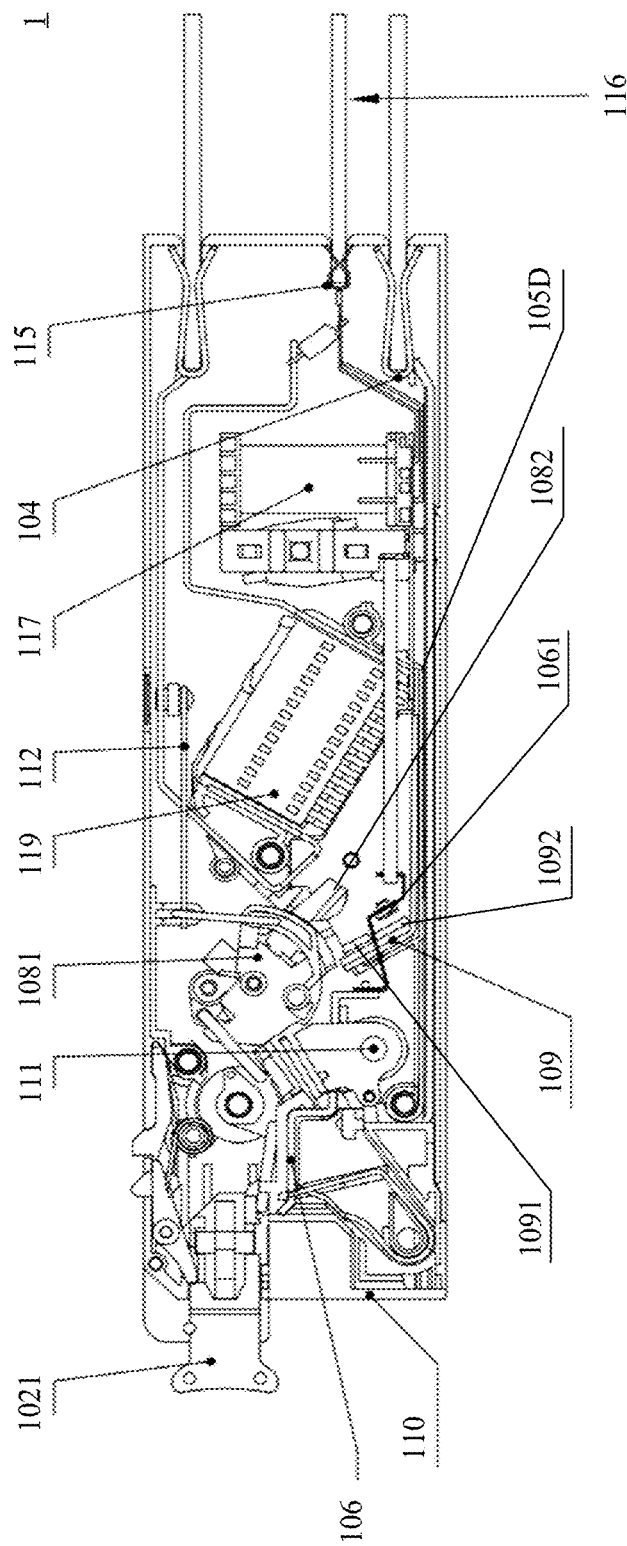
FIG. 12 is a schematic diagram of a structure of a circuit breaker according to another embodiment of this application.

For another example, in a state shown in FIG. 12, the signal circuit board 116 detects that the first moving contact 1082 is disconnected from the first fixed contact 1091 and the second moving contact 1061 is also disconnected from the second fixed contact 1092. In this case, if the power receiving line needs to be connected to the power supply line, the worker needs to press the button 1021 of the circuit breaker 1 on site; and then the signal circuit board 116 controls the contactor mechanism 117, so that the second moving contact 1061 is connected to the second fixed contact 1092. Certainly, alternatively, the signal circuit board 116 may first control the contactor mechanism 117, so that the second moving contact 1061 is connected to the second fixed contact 1092; and then the button 1021 of the circuit breaker 1 is pressed.

By using the circuit breaker 1 in this embodiment of this application, remote fault detection may be performed by the signal circuit board 116 on the circuit breaker 1. This can effectively reduce difficulty in troubleshooting a fault of the circuit breaker 1, and reduce work intensity of the worker and maintenance costs. For an electrical device disposed at a remote location, advantages of the circuit breaker 1 in this embodiment of this application are more significant.

With reference to FIG. 12, in addition to the foregoing structure, in some implementations of this application, an arc extinguishing mechanism 119 may be further disposed in the circuit breaker 1. In this way, when the first moving contact 1082 is in contact with or separated from the first fixed contact 1091 and the second moving contact 1061 is in contact with or separated from the second fixed contact 1092, the arc extinguishing mechanism 119 can effectively extinguish electric arcs generated between the first moving contact 1082 and the first fixed contact 1091 and between the second moving contact 1061 and the second fixed contact 1092. This improves safety of using the circuit breaker 1. For specific disposing of the arc extinguishing mechanism 119, the arc extinguishing mechanism 119 may be disposed at any location provided that the arc extinguishing mechanism 119 is disposed close to the first moving contact 1082, the first fixed contact 1091, the second moving contact 1061, and the second fixed contact 1092, to achieve a desirable arc extinguishing effect. For example, the arc extinguishing mechanism 119 may be provided between the operating mechanism 108 and the contactor mechanism 117. The first fixed contact 1091 and the second fixed contact 1092 of the current collection mechanism 109 may be electrically connected to the arc extinguishing mechanism 119 through a copper bar 105D, and the arc extinguishing mechanism 119 is electrically connected to the signal terminal in the signal port 115 of the circuit breaker 1. In this way, in a process in which the first moving contact 1082 is in contact with or separated from the first fixed contact 1091 and the second moving contact 1061 is in contact with or separated from the second fixed contact 1092, the operating mechanism 108 and the contactor mechanism 117 can share one arc extinguishing system, thereby improving the safety of using the circuit breaker 1.

Figure 13:
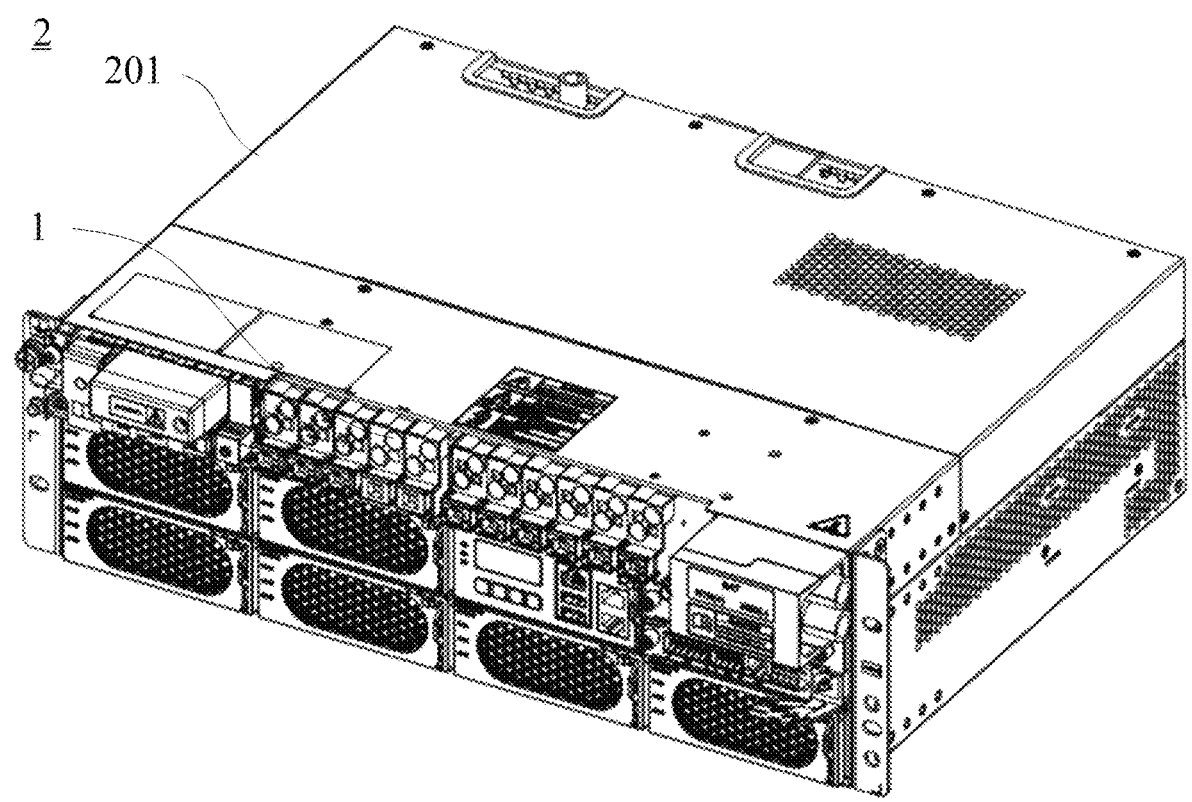
FIG. 13 is a schematic diagram of a structure of a power distribution box according to an embodiment of this application.

With reference to FIG. 13, an embodiment of this application further provides a power distribution box. The power distribution box is configured to implement circuit deployment and distribution. The power distribution box can be applied to a power supply and distribution system of a wireless high-power 5G (fifth generation mobile communications technology, 5G for short) gNB, and can also be applied to a power supply and distribution system of a household circuit. An application field of the power distribution box is not limited in this embodiment, and the power distribution box can be applied to line connections in any field.

The power distribution box 2 in this embodiment of this application may include a box body 201 and one or more foregoing circuit breakers 1 inserted into the box body 201. The plurality of circuit breakers 1 are disposed in parallel, and each circuit breaker 1 is connected to a power supply end of a power supply and distribution system. The power supply end may be a mains supply, a generator, a battery, or the like.

In this implementation of this application, the circuit breaker 1 may divide one line of electricity entering the power distribution box 2 into a plurality of lines of electricity, and each circuit breaker 1 may be connected to one electrical device or may be connected to a plurality of electrical devices. For example, in household electricity, one circuit breaker 1 may be connected to an air conditioner, another circuit breaker 1 may be connected to a refrigerator, and another circuit breaker 1 may be connected to a lighting device. The circuit breaker 1 divides one line of electricity entering the power distribution box into a plurality of lines of electricity, which are used to respectively supply power to different electrical devices. In this way, even if a fault occurs in one circuit, electrical devices in other circuits can still continue to work, thereby implementing a circuit protection function. In addition, by using the power distribution box 2 in this embodiment of this application, a working state of the circuit breaker 1 can be remotely monitored, and closing/opening of the circuit breaker 1 can be remotely controlled, thereby effectively reducing maintenance costs of the circuit breaker 1.

Obviously, a person skilled in the art can make various modifications and variations to this application without departing from the protection scope of this application. This application is intended to cover these modifications and variations of this application provided that they fall within the scope defined by the following claims and their equivalent technologies of this application.

What is claimed is:

1. A circuit breaker, comprising:
a housing, a current signal collection mechanism, an operating mechanism, a contactor mechanism, cable inlet ports, cable outlet ports, and a control apparatus, wherein:
the current signal collection mechanism, the operating mechanism, and the contactor mechanism are disposed in the housing;
the current signal collection mechanism comprises a first fixed contact and a second fixed contact, and the first fixed contact is electrically connected to the second fixed contact;
the cable inlet ports are connected to a power supply line and comprise a first electrode cable inlet port and a second electrode cable inlet port;
the operating mechanism has a rotating part and a first moving contact, the first moving contact is electrically connected to the first electrode cable inlet port, and the rotating part is configured to drive the first moving contact to rotate, wherein rotating causes a circuit between the first moving contact and the first fixed contact to become connected or disconnected;
the cable outlet ports are connected to a power receiving line and comprise a first electrode cable outlet port and a second electrode cable outlet port, the first electrode cable outlet port is electrically connected to a second moving contact, and the second electrode cable outlet port is electrically connected to the second electrode cable inlet port; and
the control apparatus is configured to control the contactor mechanism to drive the second moving contact to move, wherein moving causes a circuit between the second moving contact and the second fixed contact to become connected or disconnected.

2. The circuit breaker according to claim 1, wherein:
the circuit breaker further comprises a signal port, and a signal terminal is disposed in the signal port; and
the control apparatus is a signal circuit board, the signal circuit board is inserted into the signal port, and the signal terminal is connected to the signal circuit board by using a signal.

3. The circuit breaker according to claim 2, wherein a limiting structure is disposed in the signal port, a notch is disposed at an end of the signal circuit board, and the limiting structure is inserted into the notch.

4. The circuit breaker according to claim 2, wherein:
the circuit breaker further comprises an arc extinguishing mechanism, and the first fixed contact and the second fixed contact of the current collection mechanism is electrically connected to the arc extinguishing mechanism; and
when the circuit breaker further comprises the signal port, and the signal terminal is disposed in the signal port, the arc extinguishing mechanism is electrically connected to the signal terminal.

5. The circuit breaker according to claim 1, wherein, at least one of the following:
the control apparatus is further configured to:
detect current intensity at the first fixed contact; and
when the detected current intensity falls within a preset current intensity threshold range, determine that the circuit between the first fixed contact and the first moving contact is connected; or
when the detected current intensity exceeds a preset current intensity threshold range, determine that the circuit between the first fixed contact and the first moving contact is disconnected; or
the control apparatus is further configured to:
detect current intensity at the second fixed contact; and
when the detected current intensity falls within a preset current intensity threshold range, determine that the circuit between the second fixed contact and the second moving contact is connected; or
when the detected current intensity exceeds a preset current intensity threshold range, determine that the circuit between the second fixed contact and the second moving contact is disconnected.

6. The circuit breaker according to claim 1, wherein:
the circuit breaker further comprises a short-circuit protection mechanism, the short-circuit protection mechanism is disposed on one side of the operating mechanism, the short-circuit protection mechanism comprises an electromagnetic coil, an iron core, a shaft, an armature spring, and an armature, the electromagnetic coil is sleeved on the iron core, the armature spring is sleeved on the shaft, and the armature is fixedly connected to the armature spring, one end of the electromagnetic coil is electrically connected to the second moving contact through a conductor, and the other end of the electromagnetic coil is electrically connected to the first electrode cable outlet port; and when a current flowing through the electromagnetic coil exceeds a preset current threshold range, electromagnetic force generated by the electromagnetic coil attracts the armature to rotate around the shaft, and the armature pushes the rotating part to rotate, wherein the rotation of the rotating part causes the circuit between the first moving contact and the first fixed contact to be disconnected.

7. The circuit breaker according to claim 1, wherein:
the circuit breaker further comprises an overload protection mechanism, and the overload protection mechanism is made of a material that can bend and deform when subjected to heat, and one end of the overload protection mechanism is rigidly connected to the first electrode cable inlet port; and
when heat generated in the power receiving line exceeds a preset heat threshold range, the overload protection mechanism deforms and drives the rotating part of the operating mechanism to rotate, wherein the rotation of the rotating part of the operating mechanism causes the circuit between the first moving contact and the first fixed contact to be disconnected.

8. The circuit breaker according to claim 7, wherein:
a first sliding slot is disposed on the rotating part of the operating mechanism, and a first connecting rod is disposed between the overload protection mechanism and the operating mechanism; and
one end of the first connecting rod is hinged to the overload protection mechanism, and the other end of the first connecting rod configured to slide along the first sliding slot.

9. The circuit breaker according to claim 8, wherein a connecting part is disposed on an inner sidewall of the housing, a second sliding slot is disposed on the connecting part, and a hinge point between the first connecting rod and the overload protection mechanism is configured to slide along the second sliding slot.

10. The circuit breaker according to claim 1, wherein the circuit breaker further comprises a button mechanism, and movement of the button mechanism is configured to drive the rotating part of the operating mechanism to rotate, wherein rotation of the rotating part of the operating mechanism causes the circuit between the first fixed contact and the first moving contact to be connected or disconnected.

11. The circuit breaker according to claim 10, wherein:
the button mechanism comprises a button, a rotating shaft, and a second connecting rod, one end of the second connecting rod is fastened to an edge of the rotating shaft, and the other end of the second connecting rod is fastened to an edge of the rotating part of the operating mechanism; and
when the button moves towards an interior of the housing, rotation of the rotating shaft drives the second connecting rod to rotate, and the rotating part rotates with the second connecting rod, wherein rotation of the rotating part with the second connecting rode causes the circuit between the first fixed contact and the first moving contact to be connected; or when the button moves towards an exterior of the housing, rotation of the rotating shaft drives the second connecting rod to rotate, and the rotating part rotates with the second connecting rod, wherein rotation of the rotating part with the second connecting rod causes the circuit between the first fixed contact and the first moving contact to be disconnected.

12. The circuit breaker according to claim 1, wherein the contactor mechanism is connected to the second moving contact through a push rod.

13. A power distribution box, used in a power supply and distribution system, comprising:
a box body and a circuit breaker, wherein the circuit breaker comprises:
a housing, a current signal collection mechanism, an operating mechanism, a contactor mechanism, cable inlet ports, cable outlet ports, and a control apparatus, wherein:
the current signal collection mechanism, the operating mechanism, and the contactor mechanism are disposed in the housing;
the current signal collection mechanism comprises a first fixed contact and a second fixed contact, and the first fixed contact is electrically connected to the second fixed contact;
the cable inlet ports are connected to a power supply line and comprise a first electrode cable inlet port and a second electrode cable inlet port;
the operating mechanism has a rotating part and a first moving contact, the first moving contact is electrically connected to the first electrode cable inlet port, and the rotating part is configured to drive the first moving contact to rotate, to make a circuit between the first moving contact and the first fixed contact connected or disconnected;
the cable outlet ports are connected to a power receiving line and comprise a first electrode cable outlet port and a second electrode cable outlet port, the first electrode cable outlet port is electrically connected to a second moving contact, and the second electrode cable outlet port is electrically connected to the second electrode cable inlet port; and
the control apparatus is configured to control the contactor mechanism to drive the second moving contact to move, to make a circuit between the second moving contact and the second fixed contact connected or disconnected; and
the circuit breaker is inserted into the box body, and the circuit breaker is electrically connected to a power supply end of the power supply and distribution system.

14. The power distribution box according to claim 13, wherein:
the power distribution box comprises a plurality of circuit breakers, and the plurality of circuit breakers are disposed in parallel; and
each circuit breaker is electrically connected to one electrical device, or each circuit breaker is electrically connected to a plurality of electrical devices.

15. The power distribution box according to claim 13, wherein:
the circuit breaker further comprises a signal port, and a signal terminal is disposed in the signal port; and the control apparatus is a signal circuit board, the signal circuit board is inserted into the signal port, and the signal terminal is connected to the signal circuit board by using a signal.

16. The power distribution box according to claim 15, wherein a limiting structure is disposed in the signal port, a notch is disposed at an end of the signal circuit board, and the limiting structure is inserted into the notch.

17. The power distribution box according to claim 13, wherein, at least one of the following:
the control apparatus is further configured to:
detect current intensity at the first fixed contact; and
when the detected current intensity falls within a preset current intensity threshold range, determine that the circuit between the first fixed contact and the first moving contact is connected; or
when the detected current intensity exceeds a preset current intensity threshold range, determine that the circuit between the first fixed contact and the first moving contact is disconnected; or
the control apparatus is further configured to:
detect current intensity at the second fixed contact; and
when the detected current intensity falls within a preset current intensity threshold range, determine that the circuit between the second fixed contact and the second moving contact is connected; or
when the detected current intensity exceeds a preset current intensity threshold range, determine that the circuit between the second fixed contact and the second moving contact is disconnected.

18. The power distribution box according to claim 13, wherein:
the circuit breaker further comprises a short-circuit protection mechanism, the short-circuit protection mechanism is disposed on one side of the operating mechanism, the short-circuit protection mechanism comprises an electromagnetic coil, an iron core, a shaft, an armature spring, and an armature, the electromagnetic coil is sleeved on the iron core, the armature spring is sleeved on the shaft, and the armature is fixedly connected to the armature spring, one end of the electromagnetic coil is electrically connected to the second moving contact through a conductor, and the other end of the electromagnetic coil is electrically connected to the first electrode cable outlet port; and
when a current flowing through the electromagnetic coil exceeds a preset current threshold range, electromagnetic force generated by the electromagnetic coil attracts the armature to rotate around the shaft, and the armature pushes the rotating part to rotate, wherein the rotation of the rotating part causes the circuit between the first moving contact and the first fixed contact to be disconnected.

19. The power distribution box according to claim 13, wherein:
the circuit breaker further comprises an overload protection mechanism, and the overload protection mechanism is made of a material that can bend and deform when subjected to heat, and one end of the overload protection mechanism is rigidly connected to the first electrode cable inlet port; and
when heat generated in the power receiving line exceeds a preset heat threshold range, the overload protection mechanism deforms and drives the rotating part of the operating mechanism to rotate, wherein the rotation of the rotating part of the operating mechanism causes the circuit between the first moving contact and the first fixed contact to be disconnected.

20. The power distribution box according to claim 19, wherein:
a first sliding slot is disposed on the rotating part of the operating mechanism, and a first connecting rod is disposed between the overload protection mechanism and the operating mechanism; and
one end of the first connecting rod is hinged to the overload protection mechanism, and the other end of the first connecting rod is configured to slide along the first sliding slot.

* * * * *